Figure 1:
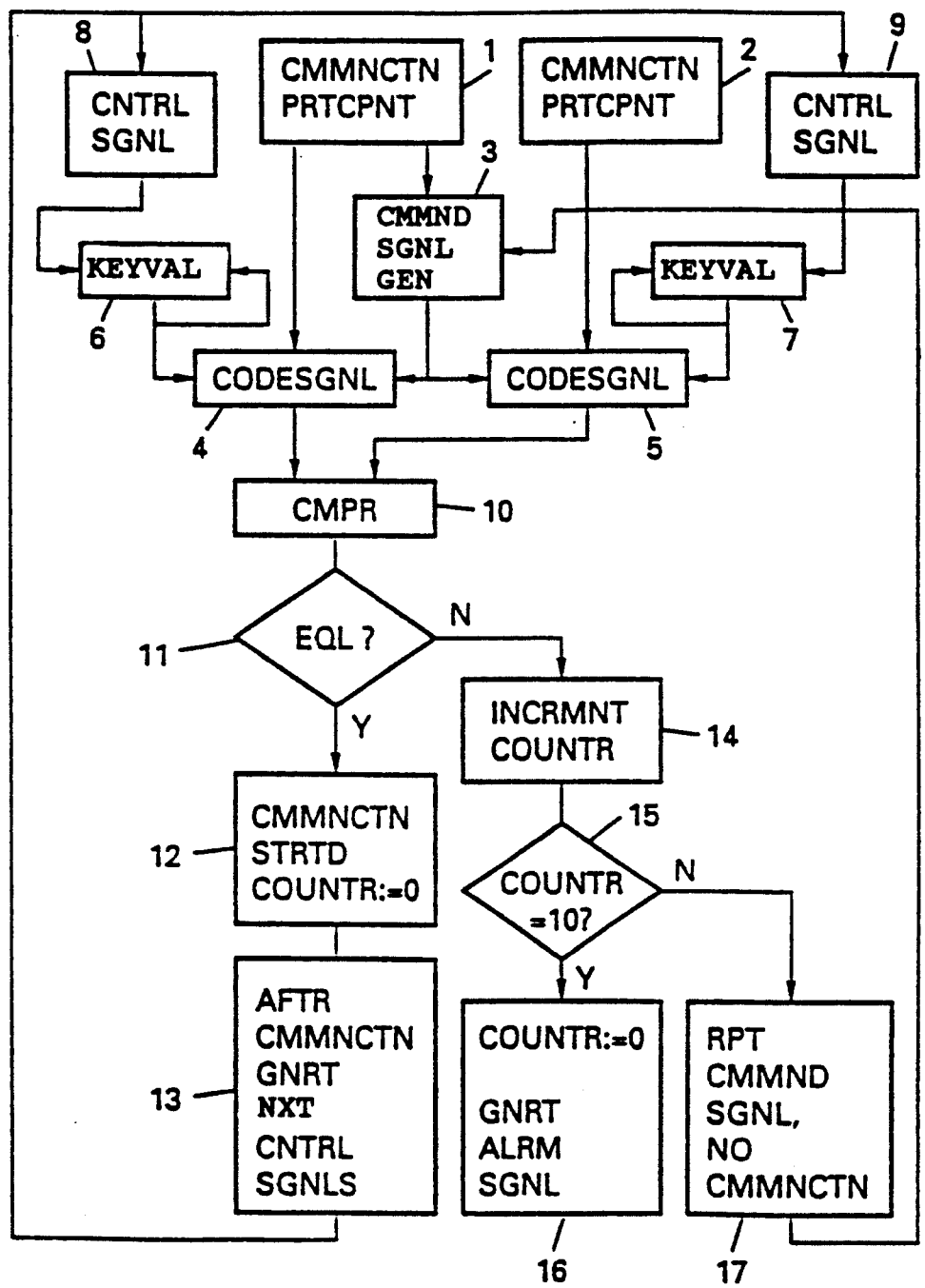

United States Patent [19]

Spaanderman et al.

[11] Patent Number: 5,325,434

[45] Date of Patent: Jun. 28, 1994

[54] METHOD FOR AUTHENTICATING COMMUNICATIONS PARTICIPANTS, SYSTEM FOR APPLICATION OF THE METHOD AND FIRST COMMUNICATIONS PARTICIPANT AND SECOND COMMUNICATION PARTICIPANT FOR APPLICATION IN THE SYSTEM

[75] Inventors: Jurgen J. Spaanderman, Sliedrecht; Klaas P. Vlieg, Groningen; Maria L. Wenas, Delft, all of Netherlands

[73] Assignee: Koninklijke PTT Nederland N.V., Groningen, Netherlands

[21] Appl. No.: 965,882

[22] Filed: Oct. 23, 1992

[30] Foreign Application Priority Data

Oct. 25, 1991 [NL] Netherlands ............... 9101796

[51] Int. Cl.$^5$ ................................................ H04L 9/00
[52] U.S. Cl. ................................... 380/45; 380/23; 380/25; 380/47
[58] Field of Search ............... 380/23, 25, 21, 45, 380/47

[56] References Cited

U.S. PATENT DOCUMENTS

| | | | |
|---|---|---|---|
| 4,074,066 | 2/1978 | Ehrsam et al. | 380/45 |
| 4,193,131 | 2/1980 | Lennon et al. | 380/25 |
| 4,218,738 | 8/1980 | Matyas et al. | 380/47 |
| 4,599,489 | 7/1986 | Cargile | 380/47 |
| 4,688,250 | 8/1987 | Corrington et al. | 380/23 |
| 4,720,859 | 1/1988 | Aaro et al. | 380/23 |
| 4,799,061 | 1/1989 | Abraham et al. | 380/23 |
| 4,805,216 | 2/1989 | Gruenberg | 380/21 |
| 4,864,615 | 9/1989 | Bennett et al. | 380/21 |
| 5,148,479 | 9/1992 | Bird et al. | 380/23 |
| 5,177,791 | 1/1993 | Yeh et al. | 380/45 |

FOREIGN PATENT DOCUMENTS 0387599  9/1990  European Pat. Off. .
2186158A 8/1987  United Kingdom .

OTHER PUBLICATIONS

"Lifetimes of Keys in Cryptographic Key Management Systems" pp. 246–259; E. Okamoto and K. Nakamura.

*Primary Examiner*—Salvatore Cangialosi
*Attorney, Agent, or Firm*—Frishauf, Holtz, Goodman & Woodward

[57] ABSTRACT

Known methods for authenticating communication participants add a code word to a command signal, which code word is a crytographic function of the command signal and a key value which in its turn is a function of a master key value and a change code word. The master key value has a permanently fixed value, in contrast to the change code word which serves to change the key value. The method according to the invention makes use of a key value which is a function of at least one previous key value, the master key value with the permanently fixed value, which, once it has been discovered or leaked, substantially weakens the encryption, no longer being required.

8 Claims, 2 Drawing Sheets

METHOD FOR AUTHENTICATING COMMUNICATIONS PARTICIPANTS, SYSTEM FOR APPLICATION OF THE METHOD AND FIRST COMMUNICATIONS PARTICIPANT AND SECOND COMMUNICATION PARTICIPANT FOR APPLICATION IN THE SYSTEM

BACKGROUND OF THE INVENTION

The invention relates to a method for authenticating communication participants, a first communication participant generating a command signal and generating a first code signal which is a function of at least the command signal and a first key value associated with the first communication participant, and a second communication participant generating a second code signal which is a function of at least the command signal and a second key value associated with the second communication participant, which first and second code signal are compared to each other, the first communication participant generating, in response to a first control signal, a subsequent first key value and the second communication participant generating, in response to a second control signal, a subsequent second key value.

A method of this type is disclosed in U.S. Pat. No. 4,688,250. This describes how a ground station (the first communication participant) and a satellite (the second communication participant, also called secondary communication participant) communicate with each other, the satellite only being allowed to execute commands originating from this one ground station and not being allowed to react to commands originating from other (hostile) ground stations. For this purpose, the ground station transmits, together with some command data (the command signal), a code word (the first code signal) which is a cryptographic function of the command data and a secret key (the first key value) which is stored in the ground station. The satellite subsequently generates, on the basis of the same command data and a secret key (the second key value) which is stored in the satellite, a code word (the second code signal), and compares this with the code word transmitted by the ground station. The two code words will be equal if and only if the two secret keys are identical. In the case of identical code words, the ground station has been authenticated sufficiently, and the command is executed by the satellite. In all other cases the command is ignored.

This does require changing the secret keys from time to time. In the abovementioned U.S. patent specification this is implemented by having the ground station transmit a key change command (the first and second control signal), in response to which both the ground station and the satellite generate new secret keys (the subsequent first key value and the subsequent second key value) which are a function of a change code word and a master key, both of which are stored in the ground station as well as in the satellite. Moreover, this change code word is changed regularly.

This known method has the drawback that the new secret keys to be generated are a function of the master key which is stored in the ground station as well as in the satellite and which has a fixed value during the entire satellite mission. As soon as the value of this master key has become known to outsiders, it becomes much easier for them to find out during the remainder of the satellite mission the new secret keys to be generated. Furthermore, this method, when applied in larger systems with considerably more secondary communication participants (such as ISDN networks with many NT's, and smart card systems), has the drawback that each secondary communication participant must have his own unique master key, and the method, when applied in many closely adjacent systems (each system comprising a first and a second communication participant, such as cordless telephone systems), has the drawback that each system should have its own unique master key, which makes additional demands on the production process.

SUMMARY OF THE INVENTION

The object of the invention, inter alia, is to provide a method in which the abovementioned drawback of the master key having the fixed value no longer occurs, in which, in the case of application in a large system with more [sic] secondary communication participants, all secondary communication participants are in principle identical, and in which, in the case of application in many closely adjacent systems, all systems are in principle identical, so that no additional demands need be made on the production process.

To this end, the method according to the invention is characterised in that the subsequent first key value is a function of at least the first key value and the subsequent second key value is a function of at least the second key value.

The invention is based on the insight that by having the (first or second) communication participant generate the subsequent (first or second) key value in response to the (first or second) control signal, the result is achieved that the subsequent key value is no longer determined on the basis of a master key having a fixed value, that all in principle identical secondary communication participants can each be made unique by varying the number of control signals per secondary communication participant immediately after installation of said participant, each secondary communication participant being provided a different number of times with a subsequent key value and thus being made unique with regard to the other secondary communication participants, and that all the closely adjacent systems, which are in principle identical, can each be made unique by varying the number of control signals per system immediately after installation of said system, each system being provided a different number of times with a subsequent key value and thus being made unique with regard to the other closely adjacent systems.

An embodiment of the method according to the invention is characterised in that the subsequent first key value is also a function of at least the first control signal and the subsequent second key value is also a function of at least the second control signal.

Generating the subsequent (first or second) key value also as a function of the (first or second) control signal achieves the result that the number of possible subsequent key values is substantially increased and that the number of control signals required for making the communication participants unique after they have been installed is substantially reduced. For example, if the control signal is a randomly generated number (which, together with the instantaneous key value, therefore determines the subsequent key value) very many communication participants who are, in principle, identical to each other, can be made almost completely unique with respect to one another, by generating only one or a few control signals.

The invention furthermore relates to a system of communication participants for application of the method described in the preamble, the first communication participant being provided with command signal generation means for generating the command signal, first code signal generation means for generating the first code signal as a function of at least the command signal and the first key value associated with the first communication participant, means of comparison for comparing the first and the second code signal with one another, and first key value generation means for generating the subsequent first key value in response to the first control signal, and the second communication participant being provided with second code signal generation means for generating the second code signal as a function of at least the command signal and the second key value associated with the second communication participant, second key value generation means for generating the subsequent second key value in response to the second control signal.

It is furthermore an object of the invention, inter alia, to provide a system for applying the method of the type described in the preamble, in which the abovementioned drawback of the master key having the fixed value no longer occurs and in which, in the case of using a large system with more [sic] secondary communication participants, all the secondary communication participants are in principle identical and, in the case of using many closely adjacent systems, all the systems are in principle identical, so that no additional demands are made on the production process.

To this end, the system according to the invention is characterised in that the first key value generation means are adapted for generating, as a function of at least the first key value, the subsequent first key value and the second key value generation means are adapted for generating, as a function of at least the second key value, the subsequent second key value.

An embodiment of the system according to the invention is characterised in that the first key value generation means are adapted for generating the subsequent first key value also as a function of the first control signal and the second key value generation means are adapted for generating the subsequent second key value also as a function of the second control signal.

The invention furthermore also relates to a first communication participant for application in the system and a second communication participant for application in the system, which first communication participant is provided with command signal generation means for generating the command signal, first code signal generation means for generating the first code signal as a function of at least the command signal and the first key value associated with the first communication participant, means of comparison for comparing the first and the second code signal with one another, and first key value generation means for generating the subsequent first key value in response to the first control signal, and which second communication participant is provided with second code signal generation means for generating the second code signal as a function of at least the command signal and the second key value associated with the second communication participant, second key value generation means for generating the subsequent second key value in response to the second control signal.

The first communication participant is characterised in that the first key value generation means are adapted for generating, as a function of at least the first key value, the subsequent first key value.

In an embodiment, the first communication participant is characterised in that the first key value generation means are adapted for generating the subsequent first key value also as a function of the first control signal.

The second communication participant is characterised in that the second key value generation means are adapted for generating, as a function of at least the second key value, the subsequent second key value. In an embodiment, the second communication participant is characterised in that the second key value generation means are adapted for generating the subsequent second key value also as a function of the second control signal.

Naturally, in the case of the method according to the invention it is also possible to authenticate from both sides. If the system, for example, comprises two first communication participants, the one may authenticate the other and vice versa, because both communication participants are provided with the command signal generation means and the means of comparison.

REFERENCE

U.S. Pat. No. 4,688,250

EXEMPLARY EMBODIMENTS

Figure 2:
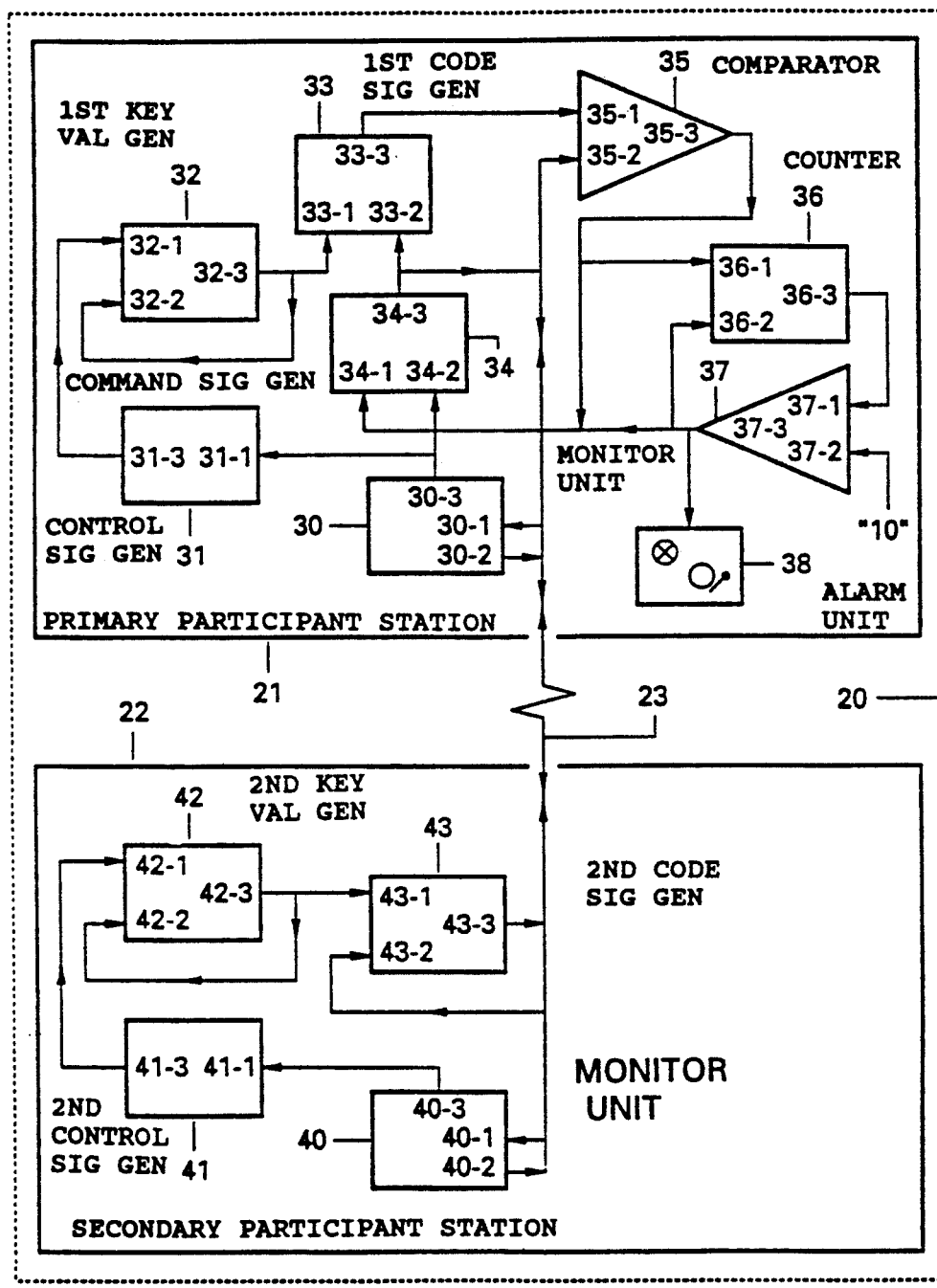

The invention will be explained in more detail by reference to an exemplary embodiment shown in the figures, in which:

FIG. 1 shows a diagrammatic illustration of the method according to the invention and FIG. 2 shows a block diagram of the system according to the invention, provided with the first and second communication participant according to the invention.

In the diagrammatic illustration of the method according to the invention shown in FIG. 1, the boxes have the following significance:

TABLE I

| | | |
|---|---|---|
| 1 | CMMNCTN PRTCPNT | the first communication participant |
| 2 | CMMNCTN PRTCPNT | the second communication participant |
| 3 | CMMNDSGNL | generating the command signal |
| 4 | CODESGNL | generating the first code signal |
| 5 | CODESGNL | generating the second code signal |
| 6 | KEYVL | generating the first key value |
| 7 | KEYVL | generating the second key value |
| 8 | CONTRLSGNL | generating the first control signal |
| 9 | CONTRLSGNL | generating the second control signal |
| 10 | CMPR | comparing the code signals |
| 11 | EQL ? | if code signals are equal: exit yes if code signals are not equal: exit no |
| 12 | CMMNCTN STRTD COUNTR: = 0 | the start of the communication after the equality of the two code signals has been found in box 11; the output of the counter (see box 14) is set to 0 |
| 13 | AFTR CMMNCTN GNRT NXT | generating the next first and second control signals after the |

TABLE I-continued

| CNTRL SGNLS | |
|---|---|
| | communication has terminated, in response to which the subsequent first and second key values are generated |
| 14 INCRMNT COUNTR | incrementing the counter by 1 after the inequality of the two code signals has been found in box 11 |
| 15 COUNTR = 10 ? | if the value of the output of the counter is 10: output yes if the value of the output of the counter is not 10: exit no |
| 16 COUNTR: = 0 GNRT ALRM SGNL | the output of the counter is set to 0 generating the alarm signal |
| 17 RPT CMMNDSGNL NO COMMNCTN | repeating the command signal communication is not yet taking place |

The method according to the invention as illustrated diagrammatically in FIG. 1 takes place as follows. If the first communication participant (box 1) wishes to communicate with the second communication participant (box 2), the first communication participant transmits a command signal (box 3). In response thereto, the first communication participant generates a first code signal (box 4) which is a function of both the command signal and a first key value (box 6), and the second communication participant generates a second code signal (box 5) which is a function of both the command signal and a second key value (box 7). Subsequently the two code signals are mutually compared (box 10, equal yes or no, box 11). If they are equal (which is only possible if the two key values are also equal to one another), the two communication participants may communicate with one another, an output of a counter to be used subsequently being set to 0 (communication started, counter:=0, box 12). After the communication, subsequent first and second control signals are generated (after communication, generate subsequent control signals, box 13), a subsequent first key value (box 6) being generated as a function of the subsequent first control signal (box 8) and of an instantaneous first key value (box 6), and a subsequent second key value (box 7) being generated as a function of the subsequent second control signal (box 9) and of an instantaneous second key value (box 7).

If the two code signals are not equal to one another (which is only possible if the two key values are also not equal to one another), the output of the counter is incremented by 1 (increment counter, box 14). Whether the output of this counter has the value 10 (counter=10 ?, box 15) is then tested. So long as this is not the case, the command signal is repeated, and no communication takes place (repeat command signal, no communication, box 17). As soon as the output of the counter has the value 10, this output is set to the value 0 and the alarm signal is generated (counter:=0, generate alarm signal, box 16).

For the method according to the invention to function correctly, it is necessary that the first and second code signal are each the same function of the command signal and of the first and second key value, respectively (in other words that box 4 and 5 are identical), that the subsequent first and second key value are each the same function of the instantaneous first and second key value, respectively, and of the first and second control signal, respectively (in other words that box 6 and 7 are identical), and that the first and second control signal are identical to one another (in other words that box 8 and 9 are identical), which could, for example, be effected by taking both of them from the output of a random generator. The output value 10 of the counter, at which the alarm signal is generated, is of course chosen completely arbitrarily from the set of natural numbers.

The first and second control signals in response to which the subsequent first and second key signals may be generated, may be transmitted either after the communication (FIG. 1) or before the communication or during the communication, in which connection the term communication should be interpreted as widely as possible. For example, it may be a telephone conversation between different (cordless) subscribers or merely a command originating from a ground station and intended for a satellite. It could also be a complete data file, or a data word, of which, for example, a number of bytes are intended for authentication.

The block diagram shown in FIG. 2 of the system 20 according to the invention comprises a first communication participant station 21 and a second communication participant station 22. For the sake of simplicity, only two mutually coupled communication participant stations are shown, in practice (such as, for example, in the case of a telephone network) many second communication participant stations may be coupled to a first communication participant station, and 2 first communication participant stations may also be mutually coupled. Communication participant station 21 and communication participant station 22 are mutually coupled via link 23, which may be implemented in either completely physical form or partly in wireless form.

Communication participant station 21 comprises a monitoring unit 30 having an input 30-1 and an output 30-2 which are both connected to link 23 for the purpose of continuously monitoring the state of the link. Monitoring unit 30 also has an output 30-3 which is connected to an input 31-1 of a control signal generator 31 which, via an output 31-3, generates a first control signal in response to a monitoring signal present at input 31-1. Output 31-3 is connected to an input 32-1 of first key value generation means 32 which, in response to the first control signal, generate a (subsequent) first key value which may be a function of the first control signal and which, in any case, is a function of an (instantaneous) first key value. To this end, an output 32-3 of key value generation means 32 is connected to an input 32-2. Output 32-3 is also connected to an input 33-1 of first code signal generation means 33, which furthermore have an input 33-2 and an output 33-3. Input 33-2 is connected to an output 34-3 of command signal generation means 34, which furthermore have an input 34-1, which is connected to link 23, and an input 34-2 which is connected to output 30-3. In response to the monitoring signal present at input 34-2 and/or the signal present at input 34-1, command signal generation means 34 generate a command signal which, via output 34-3 and input 33-2, is supplied to code signal generation means 33. Code signal generation means 33 generate a first code signal which is a function of the command signal present at input 33-2 and of the first key value present at input 33-1. The first code signal is supplied, via output 33-3, to an input 35-1 of means of comparison 35, which also have an input 35-2, which is connected to link 23 for the purpose of receiving a second code signal, and an output 35-3. Output 35-3 is connected to link 23 and to an input 36-1 of counter means 36, which furthermore have an output 36-3 which is connected to an input 37-1 of comparator 37 and an input 36-2 which is connected to an output 37-3 of comparator 37. In addition, comparator 37 has an input 37-2, to which a signal having the value 10 is supplied, and the output 37-3 is connected to link 23. If the first code signal at input 35-1 and a second signal at input 35-2 do not correspond, means of comparison 35 generate a counter signal to counting means 36 which in response thereto increment their output value by 1. As soon as this output value has the value 10, comparator 37 generates an alarm signal to alarm unit 38 and a reset signal which is supplied to counting means 36, which, in response thereto, set their output value to zero.

Communication participant station 22 comprises a monitoring unit 40 having an input 40-1 and an output 40-2 which are both connected to link 23 for the purpose of continuously monitoring the state of the link. Monitoring unit 40 also has an output 40-3 which is connected to an input 41-1 of a control signal generator 41 which, via an output 41-3, generates a second control signal in response to a monitoring signal present at input 41-1. Output 41-3 is connected to an input 42-1 of second key value generation means 42 which, in response to the second control signal, generate a (subsequent) second key value which may be a function of the second control signal and which, in any case, is a function of an (instantaneous) second key value. To this end, an output 42-3 of key value generation means 42 is connected to an input 42-2. Output 42-3 is also connected to an input 43-1 of second code signal generation means 43, which furthermore have an input 43-2 and an output 43-3. Input 43-2 is connected to link 23. Code signal generation means 43 generate a second code signal which is a function of the command signal present at input 43-2, which is supplied via link 23, and of the second key value present at input 43-1. The second code signal is supplied, via output 43-3 and link 23, to input 35-2 of means of comparison 35.

The system 20 shown in FIG. 2 works as follows. If communication is required, command signal generation means 34 generate the command signal which is supplied to code signal generation means 33 and, via link 23, to code signal generation means 43. Code signal generation means 33 generate the first code signal which is a function of the command signal and of the first key value originating from key value generation means 32. Code signal generation means 43 generate the second code signal which is a function of the command signal and of the second key value originating from key value generation means 42. The first code signal is supplied directly, and the second code signal is supplied via link 23, to means of comparison 35.

Normally, the two code signals will be identical because the two key values are identical, and means of comparison 35 generate a signal which, via link 23, is supplied to monitoring unit 30 and monitoring unit 40, in response whereto the communication can start. The means by which this communication is implemented are not shown in FIG. 2, and they may, in principle, be embodied in many ways. Thus, it is, for example, possible to arrange for subsequent command signals, which are provided with data, to be generated by the command signal generation means 34, which command signals, either encrypted or not encrypted via code signal generation means 33 and 43, are then transmitted back and fourth via link 23. It would also be possible to transmit long data words back and forth via link 23, a number of bytes of each data word serving for authentication and thus a check being carried out for each data word whether the two key values agree.

After the communication has ended, which is monitored by monitoring units 30 and 40, monitoring unit 30 generates a signal to control signal generator 31, in response whereto said generator generates the first control signal which is supplied to key value generation means 32, and monitoring unit 40 generates a signal to control signal generator 41, in response whereto said generator generates the second control signal which is supplied to key value generation means 42. Key value generation means 32 and 42, respectively, then generate the subsequent first and second key value, respectively, which is a function of the instantaneous first and second key value, respectively, and which may be a function of also the first and the second control signal, respectively. Subsequently, the next communication can take place on the basis of the new key values. It is expedient in this context that all the secondary communication participants (in FIG. 2, only 1 secondary communication participant 22 is shown) can be equipped in the same way, without each secondary communication participant having to be supplied with a unique key. Or, in the case of, for example, a cordless telephone system having a primary and a secondary communication participant station, that of all the cordless telephone systems to be equipped, all the primary communication participant stations on the one hand and all the secondary communication participant stations on the other hand can be equipped in an identical manner. After authentication has taken place only a few times, each secondary communication participant station, or each set of primary and secondary communication participant stations, will have become completely unique with respect to all the other communication participant stations or with respect to all the other sets of communication participant stations.

If the two code signals are not identical (because the two key values are not equal), means of comparison 35 generate the counter signal, in response whereto counting means 36 increment their output value by 1 and in response whereto command signal generation means 34 generate the command signal again. As a result, the two code signals are generated again by code signal generation means 33 and 43 on the basis of the instantaneous, unaltered key values of key value generation means 32 and 42, and the two code signals are compared again, etc. If the two code signals are indeed identical this time, for example because there was a fault during the previous generation, communication may start. In this case, the output value of the counting means 36 should be set to zero. If the two code signals have been found to be unequal on ten successive occasions, the output value of counting means 36 has the value ten and the comparator 37 generates the alarm signal to alarm unit 38.

The generation of the command signal by command signal generation means 34 when communication is required is generally carried out under the control of monitoring unit 30, or else under control of communication participant station 21. If communication participant station 22 is also required to be able to initiate a communication, this can be effected by making monitoring unit 40 as well as monitoring unit 30 suitable for controlling command signal generation means 34 (via link 23). Alternatively, this could be achieved by likewise providing communication participant station 22 with command signal generation means. In both cases, priority rules then have to be established in order to prevent the two communication participants stations 21, 22 getting out of synchronisation as a consequence of simultaneous notification of the desire to communicate. Moreover, communication participant station 22 could be provided with further means of comparison, further counting means and/or a further comparator, corresponding to communication participant station 21, which then makes it possible to have each communication participant station 21, 22 check the identity of the other itself.

Having each communication participant station 21, 22 check the identity of the other himself provides, with a small extension, the possibility of enabling communication even after the counting means present in both communication participants have or should have generated the reset signal and the alarm signal. By, for example, having a fixed reset key value generated in the apparatus of each communication participant station 21, 22 in response to the reset signal of the counting means, it is achieved that the two communication participants stations will subsequently generate equal code signals, which enables communication. This "resetting" should take place internally and in such a way that each communication participant station 21, 22 is only able to do this with regard to itself, it not being possible for any outsider to be able to do the same with regard to the communication participant station in question. The reset signal in this case must under no circumstances be transmitted via link 23 or reach link 23, this being prevented by providing each communication participant station 21, 22 with its own counting means 36, 37.

The design of communication participant stations 21, 22 as shown in the block diagram of FIG. 2 could be considerably simplified by omitting the two control signal generators 31, 41, in which case the two key value generation means 32, 42 may, for example, be controlled by command signal generation means 34. In practice this means that the first and second control signal then coincide with the command signal and that the subsequent key value is a function of the instantaneous key value and of the command signal.

In the case of different secondary communication participants stations 22, all of which must be able to communicate with primary communication participant station 21, it would be possible to have an identification code transmitted prior to the communication, which identification code indicates which secondary communication participant station 22 should be involved in the communication. Such an identification code could for example be added to the command signal. It is, however, also conceivable that the code signal by itself serves per se for identification, for example by each secondary communication participant station 22 having codes signal generation means 43 which are based on a unique function, or by having key value generation means which are based on a unique function. In this case it is disadvantageous that each secondary communication participant 22 then has to be provided with a unique function, which puts additional demands on the equipment task. Furthermore, all the unique functions must be known at the first communication participant station 21, which increases the latter's size and complexity.

Having the command signal generation means 34 generate the command signal once more if the two code signals are not identical is, of course, only one embodiment. It is, for example, also conceivable for this command signal to remain present at output 34-3 as long as no equality of code signals is found, i.e. until the reset signal is generated or has been generated by comparator 37.

We claim:

1. Method for authenticating communication participants, comprising the steps of
   generating a command signal and a first code signal at the instance of a first communication participant, said first code signal being a function of at least the command signal and a first key value identifying said first communication participant, and
   generating, at the instance of a second communication participant, a second code signal which is a function of at least said command signal and a second key value identifying said second communication participant;
   comparing said first and second code signals with each other;
   generating at the instance of the first communication participant, in response to a first control signal, a subsequent first key value;
   generating at the instance of the second communication participant, in response to a second control signal, a subsequent second key value, characterized in that
   of each two successive subsequent first key values consisting of a latter first key value and a former first key value, said latter first key value is a function of at least said former first key value, and of each two successive subsequent second key values consisting of a latter second key value and a former second key value, said latter second key value is a function of at least said former second key value, and so on.

2. The method according to claim 1, characterised in that each said subsequent first key value is also a function of at least the first control signal and each said subsequent second key value is also a function of at least said second control signal.

3. System of communication participant stations, wherein a first communication participant station is equipped with
   command signal generation means for generating a command signal,
   first code signal generation means for generating a first code signal as a function of at least the command signal and a first key value identifying the first communication participant station,
   means of comparison for comparing with one another the first code signal and a second code signal, generated in a second communication participant station,
   first key value generation means for generating a subsequent first key value in response to the first control signal, and wherein
   said second communication participant station is equipped with
   second code signal generation means for generating said second code signal as a function of at least said command signal and a second key value identifying said second communication participant station,
   second key value generation means for generating a subsequent second key value in response to said second control signal, characterised in that
   the first key value generation means comprise means for generating, as a function of at least said first key value, a further subsequent first key value for each successive two of said subsequent first key values and the second key value generation means comprise means for generating, as a function of at least second key value, a further subsequent second key value for each successive two of said subsequent second key values, and so on.

4. System of communication participant stations according to claim 3, characterised in that the first key value generation means comprise means for generating the subsequent first key value also as a function of the first control signal, and the second key value generation means comprise means for generating the subsequent second key value also as a function of the second control signal.

5. First communication participant station for a communication system, which is equipped with:

command signal generation means for generating a command signal, first code signal generation means for generating a first code signal as a function of at least the command signal and a first key value identifying the first communication participant station, means for comparing, with one another, the first code signal and a second code signal, and first key value generation means for generating a subsequent first key value in response to the first control signal, characterised in that the first key value generation means comprise means for generating, as a function of at least said first key value, a further subsequent first key value for each successive two of said subsequent first key values.

6. First communication participant station according to claim 5, characterised in that the first key value generation means comprise means for generating said further subsequent first key value also as a function of the first control signal.

7. Second communication participant station for a communication system, which is equipped with second code signal generation means for generating a second code signal as a function of at least a command signal and a second key value identifying the second communication participant station, and second key value generation means for generating a subsequent second key value in response to the second control signal, characterised in that the second key value generation means comprise means for generating, as a function of at least the second key value, a further subsequent key value for each successive two of said subsequent second key values.

8. Second communication participant station according to claim 7, characterised in that the second key value generation means comprise means for generating said further subsequent second key value also as a function of the second control signal.

* * * * *